United States Patent
Jarrett et al.

(10) Patent No.: US 7,457,671 B2
(45) Date of Patent: Nov. 25, 2008

(54) SYSTEMS AND METHODS THAT FACILITATE MANAGEMENT OF ADD-ON INSTRUCTION GENERATION, SELECTION, AND/OR MONITORING DURING EXECUTION

(75) Inventors: James H. Jarrett, Bay Village, OH (US); John E. Belcher, Euclid, OH (US); Russell W. Brandes, Brunswick, OH (US); Jeffery W. Brooks, Mentor on the Lake, OH (US); Bruce A. Christensen, Mentor, OH (US); Keith M. Hogan, Painesville, OH (US); Michael D. Kalan, Highland Heights, OH (US); Douglas J. Reichard, Fairview, OH (US); Diane N. Ritchie, Mentor on the Lake, OH (US); Thomas G. Rodano, Garfield Heights, OH (US); Mark E. Taylor, Chesterland, OH (US); Rae M. Varga, Cleveland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 443 days.

(21) Appl. No.: 10/955,692

(22) Filed: Sep. 30, 2004

(65) Prior Publication Data

US 2006/0100719 A1 May 11, 2006

(51) Int. Cl.
*G05B 15/00* (2006.01)
(52) U.S. Cl. ....................................... 700/1
(58) Field of Classification Search ............. 700/1
See application file for complete search history.

(56) References Cited

U.S. PATENT DOCUMENTS 3,411,388 A * 11/1968 Rappaport ............... 83/76

(Continued)

FOREIGN PATENT DOCUMENTS

EP 0586813 3/1994

OTHER PUBLICATIONS

Siemens Energy & Automation, Inc., Industrial Control Catalog (SIMATIC S7-200 Micro PLC general, 16/164-16/180 Dec. 30, 2003).*

(Continued)

*Primary Examiner*—Michael B Holmes
(74) *Attorney, Agent, or Firm*—Amin Turocy & Calvin LLP; R. Scott Speroff

(57) ABSTRACT

The subject invention relates to systems and methods that facilitate display, selection, and management of context associated with execution of add-on instructions. The systems and methods track add-on instruction calls provide a user with call and data context, wherein the user can select a particular add-on instruction context from a plurality of contexts in order to observe values and/or edit parameters associated with the add-on instruction. The add-on instruction context can include information such as instances of data for particular lines of execution, the add-on instruction called, a caller of the instruction, a location of the instruction call, references to complex data types and objects, etc. The systems and methods further provide a technique for automatic routine selection based on the add-on instruction state information such that the add-on instruction executed corresponds to a current state.

30 Claims, 9 Drawing Sheets

U.S. PATENT DOCUMENTS

| | | | |
|---|---|---|---|
| 5,042,002 | A | 8/1991 | Zink et al. |
| 5,781,776 | A | 7/1998 | Johnston et al. |
| 6,282,567 | B1 * | 8/2001 | Finch et al. ................. 709/219 |
| 6,418,216 | B1 * | 7/2002 | Harrison et al. ........ 379/208.01 |
| 7,266,425 | B2 * | 9/2007 | Bhatt et al. ................. 700/251 |

OTHER PUBLICATIONS

Siemens Industrial Control Products (SIMATIC S7-200 Micro PLC, 10 logic control, p. 649-661, Mar. 12, 2001.*

Xtensa: a configurable and extensible processor Gonzalez, R.E.; Micro, IEEE vol. 20, Issue 2, Mar.-Apr. 2000 pp. 60-70 Digital Object Identifier 10.1109/40.848473.*

A Software-Configurable Processor Architecture Gonzalez, R.E.; Micro, IEEE vol. 26, Issue 5, Sep.-Oct. 2006 pp. 42-51 Digital Object Identifier 10.1109/MM.2006.85.*

European Search Report dated Dec. 28, 2007 for European Patent Application Serial No. 05014288.4-1239, 4 Pages.

* cited by examiner

SYSTEMS AND METHODS THAT FACILITATE MANAGEMENT OF ADD-ON INSTRUCTION GENERATION, SELECTION, AND/OR MONITORING DURING EXECUTION

TECHNICAL FIELD

The subject invention relates to industrial control systems and, more particularly, to systems and methods that create and manage add-on instructions that are called by programs executing within industrial devices.

BACKGROUND OF THE INVENTION

Industrial controllers are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or effectuate outputs associated with control of the process. Such inputs and outputs can be binary, (e.g., "1" or "0," "on" or "off," . . . ), and/or analog, assuming a continuous range of values. A typical control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can serve in the capacity of an electrical interface between the controller and the controlled process and can be located local or remote from the controller. Inputs and outputs can be recorded in an I/O memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like.

During execution of the control routine, values of the inputs and outputs exchanged with the controlled process can pass through memory. The values of inputs in memory can be asynchronously or synchronously updated from the controlled process by dedicated and/or common scanning circuitry. Such scanning circuitry can communicate with input and/or output modules over a bus on a backplane or network. The scanning circuitry can also asynchronously or synchronously write values of the outputs in memory to the controlled process. The output values from the memory can be communicated to one or more output modules for interfacing with the process. Thus, a controller processor can simply access the memory rather than needing to communicate directly with the controlled process.

In distributed control systems, controller hardware configuration can be facilitated by separating the industrial controller into a number of control elements, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines. Various control modules of a distributed industrial control system can be spatially distributed along a common communication link in several locations. Certain I/O modules can thus be located proximate a portion of the controlled equipment, and away from the controller. Data can be communicated with these remote modules over a common communication link, or network, wherein all modules on the network communicate via a standard communications protocol.

In a typical distributed control system, one or more I/O modules are provided for interfacing with a process. The outputs derive their control or output values in the form of a message from a master or peer device over a network or a backplane. For example, an output module can receive an output value from a processor via a communications network or a backplane communications bus. The desired output value is generally sent to the output module in a message. The output module receiving such a message will provide a corresponding output (analog or digital) to the controlled process. Input modules measure a value of a process variable and report the input values to another device over a network or backplane. The input values can be used by a processor for performing control computations.

As noted above, a controller can execute routines to control machines, processes, manufacturing equipment, plants, and the like, and such routines can be created in a controller configuration environment and downloaded to the controller for execution. In many instances, an end-user tailors code for a particular controller in order to control a specific machine, process, equipment, plant, etc. in a desired manner. Within this code, the end-user can make one or more calls to one or more add-on instructions. Such add-on instructions, in general, respectively include and relate a set of re-usable routines, data parameters and/or state data. When viewing logic or state data in a user interface (UI) for an add-on instruction routine, the end-user generally is unable to determine which specific call to that routine is causing a particular data value to be set to the current value. In addition, if there are multiple calls, respective calls typically overwrite data visible in the UI, and the last call that wrote to the value before the UI is updated is shown. This inability to distinguish which call caused the data value to be set is a significant shortcoming with conventional systems.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The subject invention provides systems and methods that facilitate re-use of logic encapsulated in an add-on instruction(s) that are called by a program(s) executing within an industrial device. Such add-on instructions can be generated through a controller configuration environment to include and relate routines, various parameters and/or state data (e.g., local tags) and can be protected by various known security techniques to mitigate unauthorized access. During execution, references (e.g., pointers) to complex data, objects and/or other parameters can be passed to one or more of the add-on instructions. For example, structured data types or motion axes can be passed to the add-on instructions by reference.

The configuration environment can provide for a relaxed mode, wherein a user can write logic for routines, define parameters or tags, and/or generate interfaces in any order including switching between writing logic, defining parameters or tags, and generating interfaces at any time without compromising the add-on instruction. In addition, associated help can be automatically generated, edited and provided to the end-user. Add-on instruction generation can be facilitated through essentially any industrial control language(s) to render an add-on instruction in a similar and/or different industrial control language(s). Furthermore, one or more add-on instructions can be assembled as a library.

The systems and methods employ a data context manager that tracks calls to add-on instructions and provides (e.g., as a list) context associated with such calls to a user, wherein the context can include at least one or more of an instruction call(s), a caller(s), location(s), an instruction instance(s), a result(s) of such execution, references to complex data types and objects, etc. A user can select a context from a plurality of contexts in order to observe execution for that context and/or edit the context information.

The subject invention further provides a routine selection component that chooses a suitable set of control logic for an executing add-on instruction based on a state of the add-on instruction or controller. It is to be appreciated that an add-on instruction as well as other program modules can be associated with various states. For example, an add-on instruction can execute a particular set of control logic for normal, enable false, pre-scan, and post-scan states. In another example, an equipment phase program module can execute a particular set of control logic for pre-state, running, holding, resetting, restarting, stopping, aborting, and fault states. In another example, a program module can execute a particular set of logic for main and fault states. In yet another example, a multiple method object program module can execute any one of a set of user-specified sets of control logic based on a call to a particular user defined state. Depending on the program module and the state, the routine selection component can obtain suitable logic for execution, which can ensure proper pre- and post-conditions are available during execution of the add-on instruction. It is to be appreciated that the program modules, the set of control log, and/or the selection algorithm are extensible and not limited to any particular example described herein.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
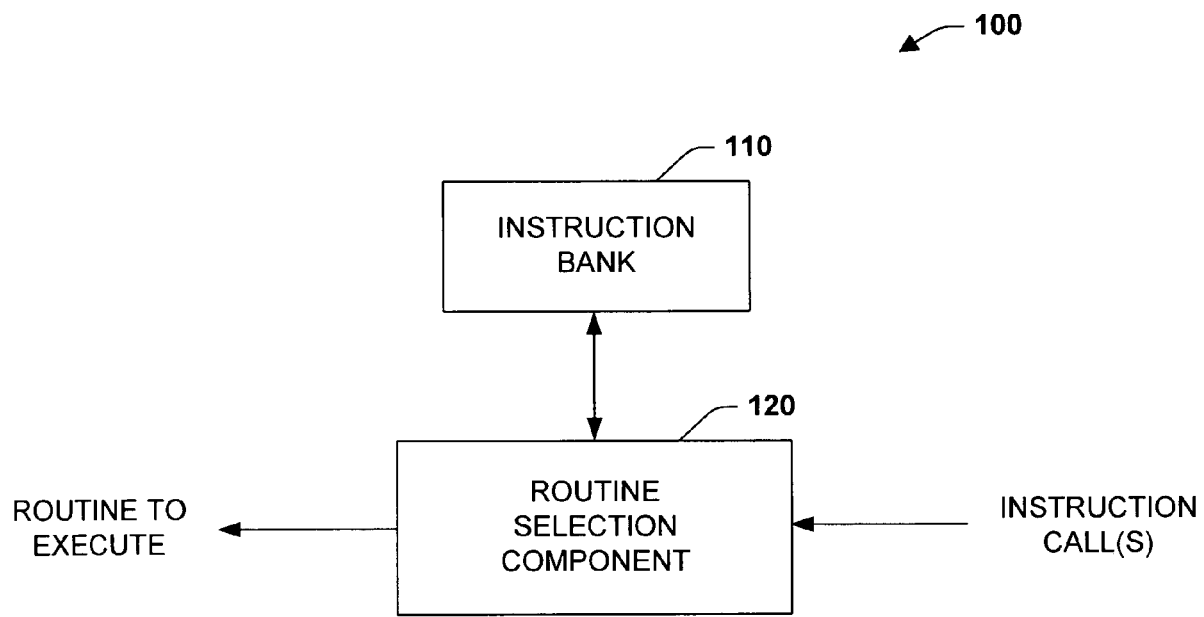
FIG. 1 illustrates an exemplary system that facilitates management of add-on instruction context information.

As utilized in this application, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

The subject invention relates to systems and methods that facilitate display, selection, and management of instruction-call data context for monitoring and/or changing values during execution. The system and methods can track essentially all add-on instruction calls and provide the user with associated context, wherein the user can select a particular context to observe data values and/or edit parameters associated therewith. Monitoring of such information can be in the visual context of the instruction logic or in state data and parameters. The context can include information such as instances of data for particular lines of execution, the add-on instruction called, a caller of the instruction, a location of the instruction call, references to complex data and objects passed to the instruction, etc. The systems and methods further provide automatic control logic selection based on state information such that the control logic executed corresponds to the current state of the add-on instruction. Moreover, add-on instruction development, packaging and execution by a user program can be performed via any industrial control languages, including similar or different languages for development, packaging and/or instruction calls.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that facilitates management of instruction-call data context for monitoring and changing values during instruction execution. The system 100 includes an instruction bank 110, which can be utilized to store add-on instructions that include and relate one or more routines (control logic) with associated parameters (e.g., value parameters such as In and Out, and reference parameters such as InOut) and state data (e.g., local tags). It is to be appreciated that such routines can be generated in essentially any programming language. Examples of suitable languages include industrial control languages (e.g., structured text (ST), sequential function chart (SFC), functional block diagram (FBD), instruction list (IL), and ladder diagram (LD)), C, C++, C#, Graphical Motion Language (GML), Java, Flow-Charts, etc., and/or any combination thereof. Such flexibility allows a developer to select a language(s) suited to a particular task(s) and provides for decomposition into logical elements and modularization to construct instruction sets that can be re-used, mitigate errors, and increase programming and user efficiency.

An end-user program can call one or more add-on instructions stored in the instruction bank 110 for execution within an industrial controller. For example, the end-user can write a program (routine or instruction) for a controller, wherein the program can include one or more calls to one or more add-on instructions in the instruction bank 110. When an add-on instruction is called, a particular routine (control logic) of the add-on instruction can be executed based at least in part on the instruction call, a state of the add-on instruction, and/or a mode of operation.

The system 100 further includes a routine selection component 120, which can facilitate determining which particular routine to execute. For example, multiple entry points can be associated with a program module, and the routine selection component 120 can facilitate logic execution of the multiple entry points based at least in part on state related information. By way of example, an add-on instruction program module can execute a particular set of control logic for normal, enable false, pre-scan, and post-scan states. Depending on the state, the routine selection component 120 can facilitate selection of suitable logic for execution. In another example, an equipment phase program module can execute a particular set of control logic for pre-state, running, holding, resetting, restarting, stopping, aborting, and fault states. In yet another example, a program module can execute a particular set of logic for main and fault states. In still another example, a multiple method object program module can execute any one of a set of user-specified sets of control logic based on a call to a particular user defined state. In general, there are a number of configurable options related to state and the routine selection component 120 can ensure that suitable and/or desired pre- and post-conditions are available during execution.

It is to be appreciated that various parameters associated with an add-on instruction can be passed by reference (e.g., pointer to memory) and can support essentially any tag type and/or object type. Passing by reference can provide for increased flexibility and power. It is to be appreciated that such parameters can be passed into an add-on instruction via an N-dimensional (e.g., one, two, three . . . ), wherein N is an integer equal to or greater than one, array or matrix of virtually any size including a variable size. In addition, a reference can be handled such that the size is automatically determined by software and/or firmware, for example, based on levels of nesting and/or other factors. In many instances, such references cannot be overwritten by the user logic and/or are not stored. However, the invention is not so limited. Local objects can be handled via a similar approach in order to prevent unauthorized overwriting and/or other unauthorized actions. In addition, such data can include message, alarm, motion axis, motion group, coordinate system related data, for example.

Figure 2:
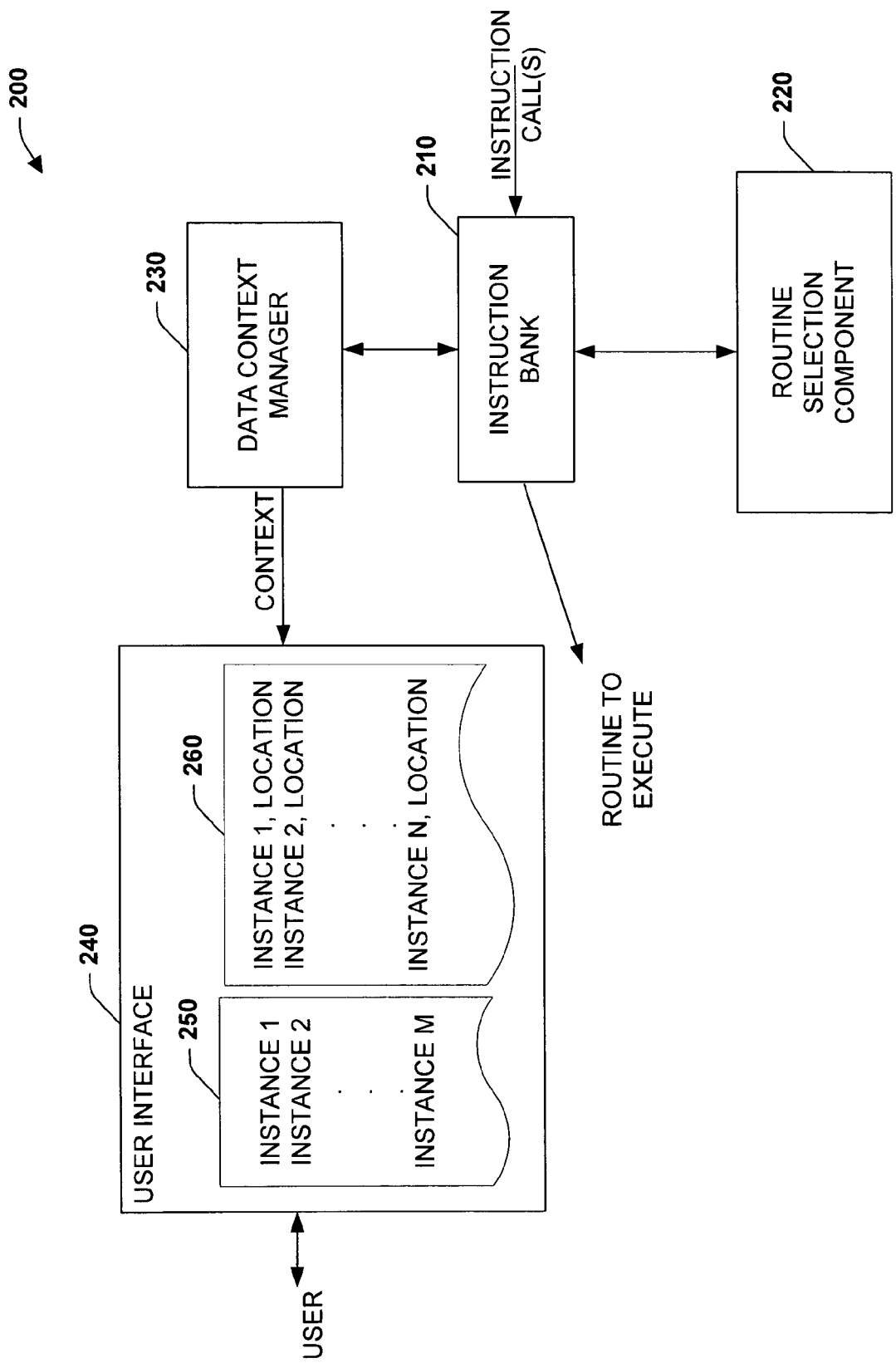
FIG. 2 illustrates an exemplary system that employs a routine selection component that facilitates automatic selection of a set of control logic (routine) based on state information.

FIG. 2 illustrates the system 200 that facilitates management of instruction-call data context for monitoring and changing values during instruction execution. The system 200 includes an instruction bank 210 and a routine selection component 220. It is to be appreciated that the instruction bank 210 and the routine selection component 220 can be substantially similar to the instruction bank 110 and the routine selection component 120 described in connection with FIG. 1.

The system 200 further includes a data context manager 230. When an add-on instruction call is added to a program, the data context manager 230 (e.g., a software user interface) works with the configuration environment to determine where the add-on instruction is referenced and/or log associated information such as the call, the caller, various parameters (as described herein), the instruction(s) called, references to complex data and objects passed to the instruction, etc. In addition, when multiple calls to instructions are made, the data context manager 230 can determine and retain information related to one or more of the calls. This information can be (automatically and/or on demand) provided by the data context manager 230 to the end-user via visual (e.g., hardware and/or software indicators, user interface, e-mail, an instant message, paper . . . ) and/or audible (e.g., speaker, cell phone . . . ) data.

With many conventional systems, the end-user is updated with a current value based on a defined time duration, wherein the last instruction instance executed during the duration typically determines the value provided to the end-user whereas prior calls and results are not provided to the end-user. The data context manager 230 provides a novel approach that mitigates this short coming. For example, the data context manager 230 can provide the end-user with essentially all the different instances of data including referenced objects such that there is no ambiguity regarding which instruction call is changing data values. With such data, a particular context can be selected for observation and/or edited. It is to be understood that an instruction definition can also be considered a data context that can be viewed and modified to set default values for parameters and local tags from that context. As such, when a new tag based on an add-on instruction type is created, the newly created tag can be initialized with the default values, and if a parameter is added, a new default value can be set into that member for any existing tags.

Furthermore, the data context manager 230 can provide associated information such as the call(s), caller(s), instruction(s) called, parameters, references to complex data and objects passed to the instruction, etc. The data context manager 230 can provide this information as well as other information to the end-user via a UI 240, and the end-user can utilize the UI 240 to input information to create, modify, delete, etc. add-on instructions and/or other program modules, and associated parameters, state, etc. In one aspect of the subject invention, add-on instruction context information can be provided to the end-user via the UI 240 as a list 250 of all the different instances of data that can be animated, for example, in various logic editors and/or data monitors. As depicted, list 250 can include M instances, wherein M is an integer equal to or greater than one. For multiple calls from a similar context, the location of respective calls can additionally be listed. This is illustrated in a list 260, which includes N instances and associated locations. The end-user can select a particular entry within the lists 250 and 260 in order to observe and/or edit such information. Moreover, it is to be appreciated that such data context can be maintained for all editors such that whenever a value is set, it is definitively setting the value in a particular context, and the instruction definition can be viewed and modified to set default values for parameters including passed references and state data from that context as described above.

The UI 250 can be a graphical user interface (GUI), a command line interface, an Application Programming Interface (API), an industrial control system environment, and the like. As such, the UI 250 can provide a region and/or means to alter and/or manipulate graphical objects (e.g., icons, structures, text boxes, etc.) in connection with end-user applications and/or user interfaces. In addition, input regions can be provided for entry of parameters, arguments, etc. that can be utilized to effectuate such entities. Moreover, one or more presentation regions can be provided to dynamically present interfaces to the end-user to provide a preview of any alteration, manipulation and/or change. The GUI can include basic text and/or graphic regions that incorporate dialogue boxes, static controls, drop-down-menus, list boxes, pop-up menus, edit controls, combo boxes, radio buttons, check boxes, push buttons, and graphic boxes, for example. In addition, utilities such as vertical and/or horizontal scroll bars that facilitate navigation and toolbar buttons to determine whether a region will be viewable, hidden, minimized, etc. can be employed.

The end-user can interact with at least the aforementioned regions to select and provide information via various devices such as a mouse, a roller ball, a keypad, a keyboard, a pen and/or voice activation, for example. Typically, a mechanism such as a push button or an enter key on the keyboard/keypad can be employed subsequent to entering textual and/or voice information in order to invoke a response. However, it is to be appreciated that the invention is not so limited. For example, merely highlighting a check box can elicit an action. In another example, a command line user interface can be employed to prompt (e.g., via a text message on a display and an audio tone) the end-user to perform an action or provide information via alpha-numeric input corresponding to an option provided in the prompt or an answer to a question posed in the prompt. It is to be appreciated that the command line interface can be employed in connection with a GUI and/or API.

Figure 3:
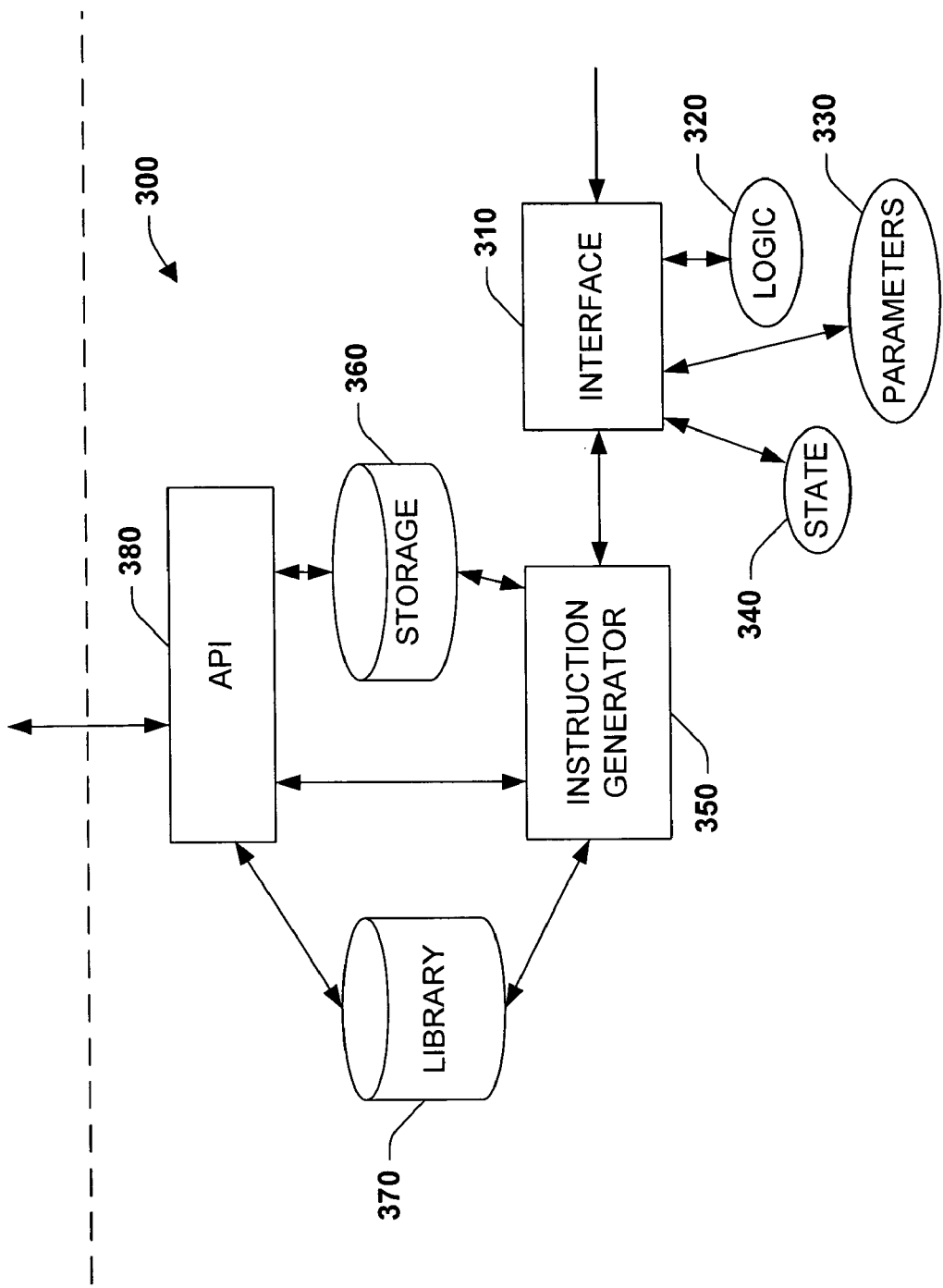
FIG. 3 illustrates an exemplary system that presents context information to a user as a list within a user interface.

FIG. 3 illustrates a system 300 that facilitates generating add-on instructions and/or other programs. The system 300 comprises an interface 310, which can be a graphical user interface (GUI), a command line interface, an Application Programming Interface (API), an industrial control system environment, and the like. The user interface 310 can provide a developer with tools for creating and/or editing add-on instructions, including associating various logic 320, parameters 330, and/or state 340. It is to be appreciated that development can be achieved via standard industrial control languages such as structured text (ST), sequential function chart (SFC), functional block diagram (FBD), instruction list (IL), and ladder diagram (LD), as well as other languages such as C, C++, C#, Graphical Motion Language (GML), Java, Flow-Charts, etc., and/or any combination thereof.

In one aspect, the developer can invoke an instruction generator 350 to create a package of one or more add-on instructions, wherein add-instructions and/or packages thereof can be generated in essentially any programming language, including industrial control languages like ST, SFC, FBD, IL, and LD and various combinations thereof, which provides flexibility and allows a developer to select a language(s) suited to a particular task(s). In addition, the foregoing provides for modularization and re-use, which can improve programming and user efficiency.

Furthermore, add-on instructions can be assembled as a library. The library can be created via a markup language (e.g., Extensible Markup Language (XML), Standard Generalized Markup Language (SGML), Hyper Text Markup Language (HTML) . . . ), a binary file, an SQL database, etc., wherein the controller language appears inside the language as content of a routine. It is to be appreciated that individual add-on instructions, a package of more than one add-on instruction, and/or a library of add-on instructions can be encrypted, encoded, password protected, etc. in order to prevent unauthorized users from accessing the instructions. In addition, properties associated with such instructions and/or libraries can be configured to provide and/or limit read, write, and execute privileges.

Moreover, in each language, the visualization of an add-on instruction can be specific to that language based on its parameter configuration. For example, non-required, visible BOOL output parameters can be displayed as value-animated "bit-legs" displayed attached to the instruction in ladder. In another example, pins in FBD can be automatically laid out based on their order in the add-on instruction.

It is to be appreciated that creation of such add-on instructions and/or packages and/or libraries of add-on instructions can be facilitated in a relaxed mode. Such relaxed mode allows the developer to write the logic first and define parameters and tags as desired, wherein the interface and data block can be automatically defined. Alternatively, the developer can define interface specification and subsequently write the logic. In yet another alternative, the developer can approach an instruction from its data manipulation in the tag editor and subsequently write its definition and/or logic. Moreover, the developer can switch between any these techniques without compromising an instruction. In addition, associated help can be automatically generated from the configuration of an instruction. Such help can be edited by the developer to include additional text, if desired, and provided to the end-user.

Generated add-instructions can be saved in a storage component 360, assembled as a library in library 370 and/or transferred to an industrial control system via an API 380. Additionally, add-instructions saved within the storage component 360 (which can be substantially similar to an instruction bank as described herein) and/or saved within the library 370 can be conveyed to the industrial control system via the API 380. Furthermore, the add-on instructions can track what other nested instructions they depend on when they are moved within projects, across projects, or between projects and libraries. In general, a project is a container of programs and add-on instructions that is loaded to a controller. When copied into a project, the instructions it depends on can be automatically copied. If an instruction's name is the same as another instruction in the destination, mitigating handling can be employed that allows the user to update the revision in the destination or to resolve the collision. In particular, when a name is utilized by more than one instruction, the end-user can be provided with an option of updating the definition with the source revision, wherein tags and other uses of the existing instruction are updated to the new revision, thus preserving at least a portion of the current state data, wiring, and/or other configuration, and unneeded dependencies are not copied.

In another aspect of the invention, when a copied add-on instruction includes other (e.g., nested) instructions, the update can search the destination project, the source project/library, and/or other libraries to find nested instructions to fill dependencies. If only one instruction is found, it can be automatically copied. If there are multiple potential matches, the user can be provided with a message to resolve the matches. When only one instruction by a particular name exists and such instruction is updated, associated instructions can be automatically updated. It is to be appreciated that a set of locations of libraries can be configured to describe which libraries to search for dependencies and which instructions are available for employment. These locations can be local, network, web server, and/or other type of drives. Information about who created an instruction and when, who last changed it and when, and what the origin library of an instruction can be tracked regardless of where the instruction is copied. In addition, any or all such information can be protected or removed. For example, such information can be removed such that a library can be distributed without personal identity information.

The interface 310 can further be utilized by an end-user to generate end-user specific programs that call one or more add-on instructions. Such programs can be generated via industrial control languages such as ST, SFC, FBD, IL, and LD and various combinations thereof, including a language(s) similar and/or different from the language utilized by particular add-on instruction called by the program. Generation, storage, modification and/or employment can be achieved utilizing a technique substantially similar to that described above in connection with generating add-on instructions and/or packages thereof. Briefly, the end-user can develop programs via the interface 310 and instruction generator 350, wherein such programs can call add-on instructions in the storage component 360 and/or library 370. In addition, such programs can be stored within the storage component 360 and/or conveyed to the industrial control device for execution. Moreover, such programs can be retrieved from the industrial control device and modified.

Figure 4:
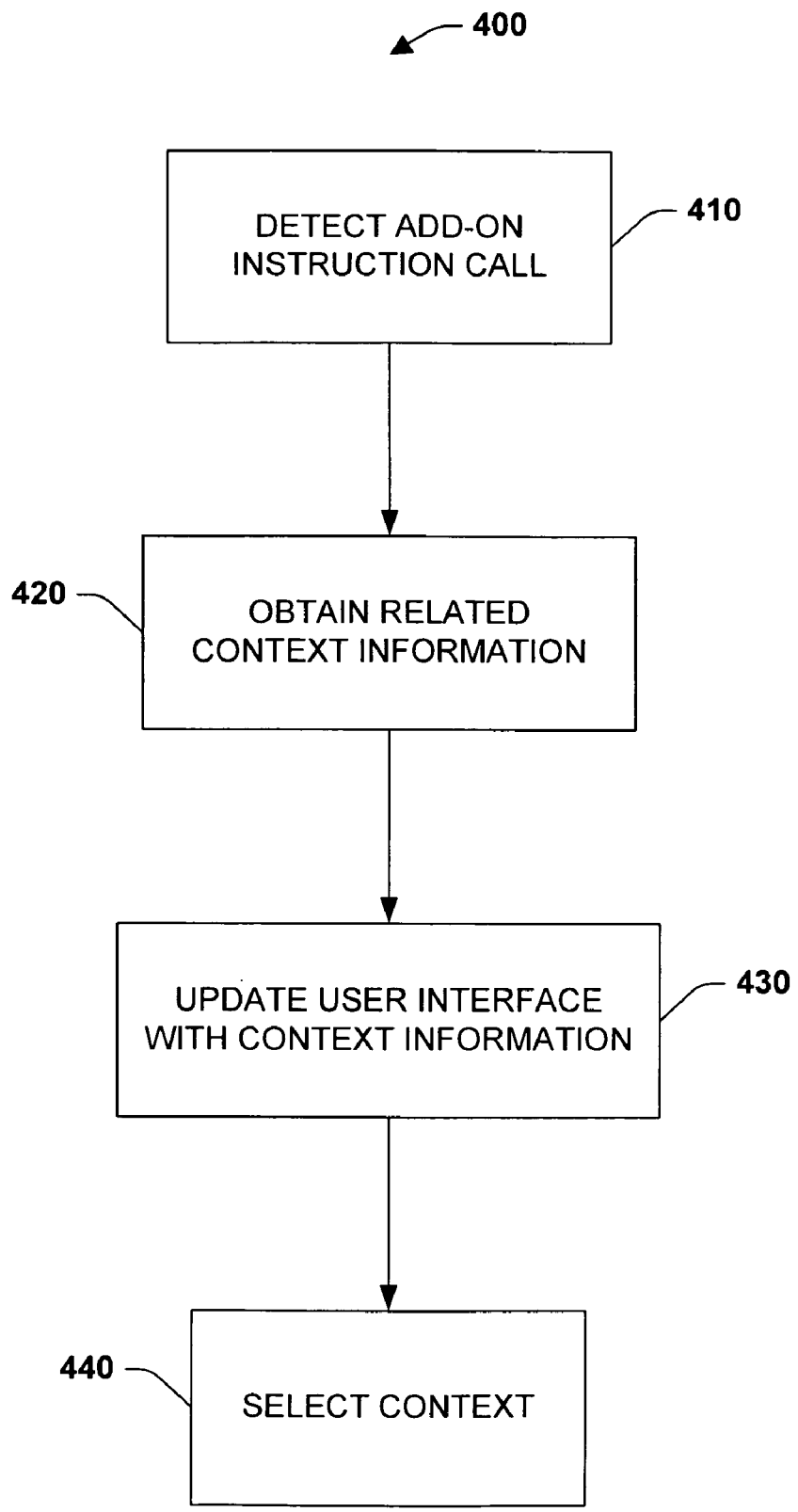
FIG. 4 illustrates an exemplary method that manages add-on instruction context during execution.
Figure 5:
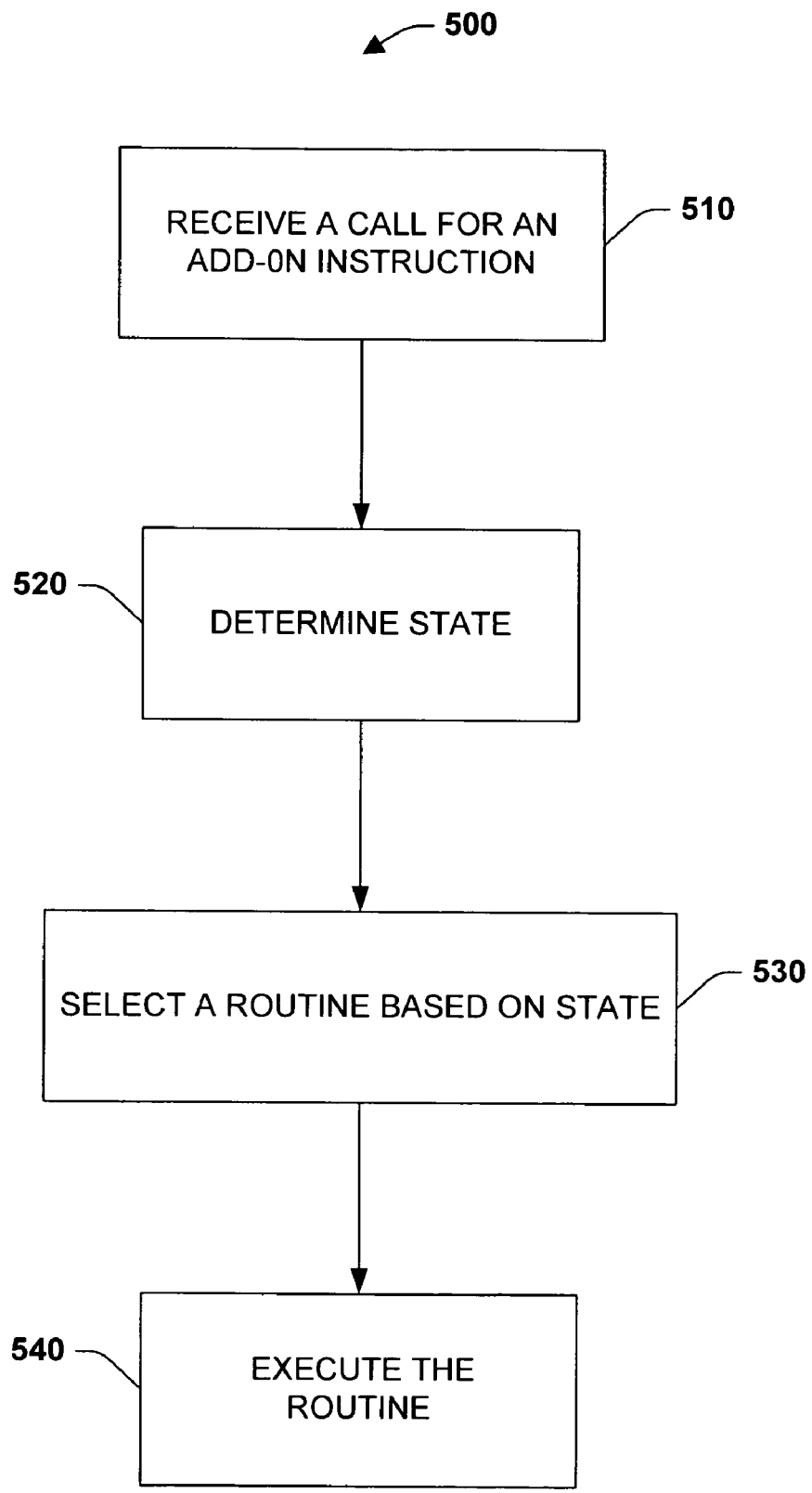
FIG. 5 illustrates an exemplary method that automatically selects a set of control logic for execution based on state.

FIGS. 4-5 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 4 illustrates a methodology 400 that facilitates monitoring add-on instruction logic. At reference numeral 410, a call to an add-on instruction is recognized in the program configuration. For example, the add-on instruction can be called by a program or another instruction. It is to be appreciated that the program and the instruction call can be generated in essentially any industrial control language (e.g., structured text (ST), sequential function chart (SFC), functional block diagram (FBD), instruction list (IL), and ladder diagram (LD)) and/or other languages such as C, C++, C#, Graphical Motion Language (GML), Java, Flow-Charts, etc., In addition, the program language can be similar or different from the programming language utilized for the add-on instruction. In addition, a plurality of add-on instructions can be serially and/or concurrently called by one or more programs executing within the controller. At reference numeral 420, context information related to a call to an add-on instruction is obtained. Such information can include, for example, the call(s), a caller(s) of the call, an instruction(s) called, an instance(s) of data, references to complex data types and objects, etc.

At 430, the context information can be provided to the end-user. In one aspect of the subject invention, the information can be provided as a list within a user interface or industrial control software environment. Such list can include essentially all instances of data that can be animated within an editor or monitor. For multiple calls from a similar tag, the location of respective calls can additionally be included in the list. At 440, a user can select a particular entry within the list in order to observe and/or edit the context information (e.g., instances of data for particular lines of execution, an instruction call, a caller of the instruction, a location of the instruction call, references to complex data and objects passed to the instruction, etc) associated with the entry. Moreover, it is to be appreciated that such data context can be maintained for all editors such that whenever a value is set, it is definitively set in a particular known context, and the instruction definition can be viewed and modified to set default values for parameters and local tags from that context, as described above.

FIG. 5 illustrates a methodology 500 that facilitates routine selecting based on a state of an industrial controller. At reference numeral 510, a call for an add-on instruction is received. In one instance, such call can be associated with a program executing within the controller. It is to be appreciated that the program and/or add-on instruction can be based on essentially any industrial control language, in cluding similar or different languages. At reference numeral 520, a current state of the add-on instruction and/or controller is determined. Examples of suitable states of the add-on instruction include: normal; enable false; pre-scan, and post-scan.

At 530, a routine is selected based on the state of the add-on instruction and/or controller. By way of example, the add-on instruction can have a routine that is executed during the normal scan. However, the add-on instruction can also be associated with additional routines such as override routines, for example, for execution in the other modes. For example, the add-on instruction optionally includes a routine(s) that is executed during initialization and a routine(s) that is executed during cleanup of instruction states: pre-scan; post-scan; and enable false. In general, there are a number of configurable options related to these states. The present method facilitates ensuring suitable and/or desired pre- and post-conditions are available during execution. At reference numeral 540, the selected routine(s) can be executed. It is to be appreciated that parameters associated with the add-on instruction (e.g., complex data types and objects) can be passed by reference and/or can support essentially any tag type and/or object type as described herein.

Figure 6:
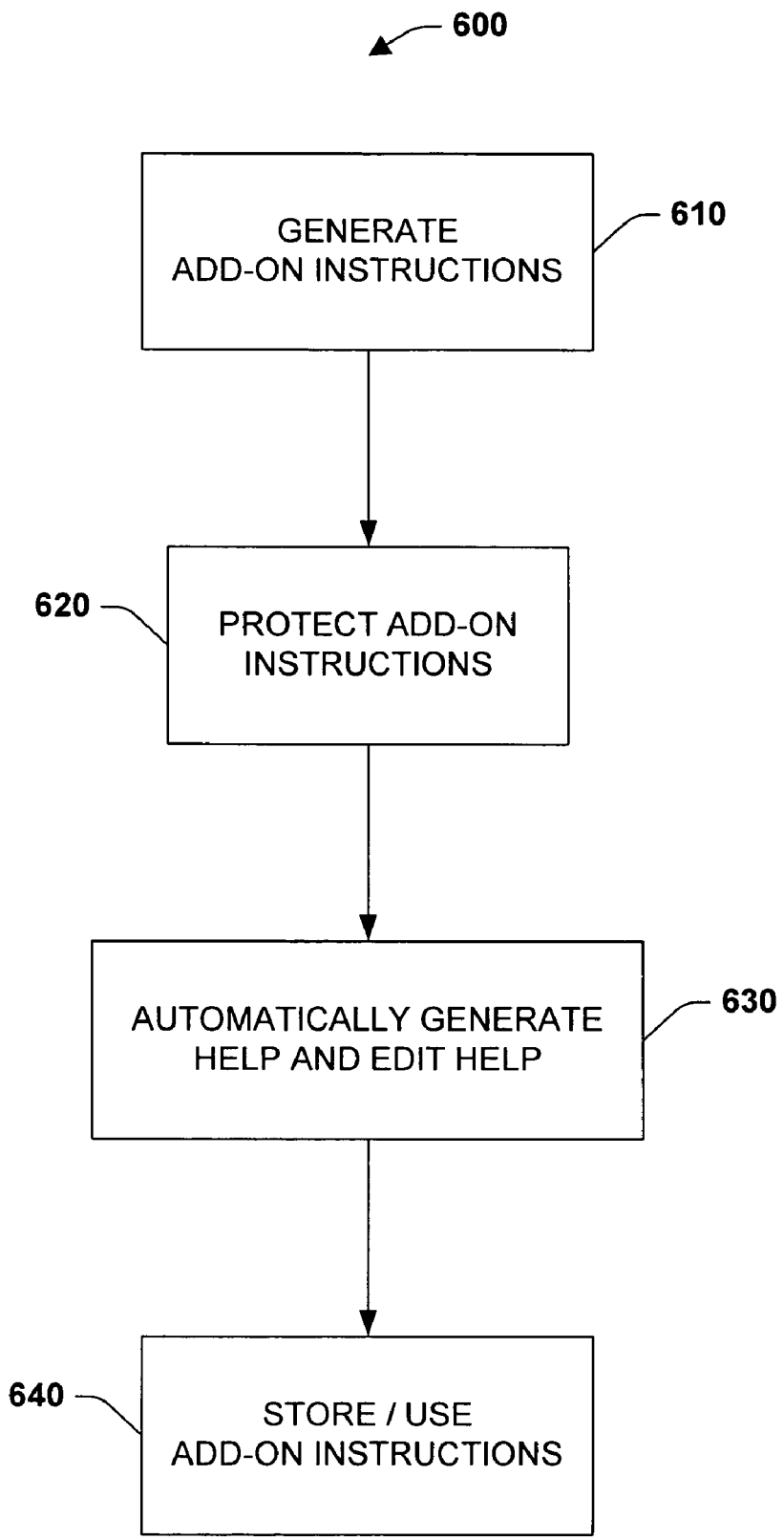
FIG. 6 illustrates an exemplary method for generating add-on instructions.

FIG. 6 illustrates a methodology 600 that generates add-on instructions and/or other program modules. At 610, one or more add-on instructions are generated. Such instructions can be created via an interface such as a GUI, a command line interface, an API, an industrial control system environment, and the like. The interface can provide a developer with tools for creating and/or editing add-on instructions, including associating various logic, parameters, and/or state. Such development can be accomplished via any industrial control languages such as ST, SFC, FBD, IL, and LD and various combinations thereof. Generated add-on instructions can be packaged and/or assembled in a library, and such packages and/or libraries can be based on similar or different languages. Moreover, such libraries can be based on essentially any language (e.g., as described herein) to facilitate dispersion and utilization.

At reference numeral 620, the add-on instructions can be encrypted, encoded, password protected, configured (e.g., read, write and execute privileges), etc. in order to prevent unauthorized users from access the instructions. At 630, associated help can be automatically generated for an add-on instruction. Such help can be edited to include additional text, and/or be provided as graphical files, drawings, audio, html, external links, etc. It is to be appreciated that creation of such add-on instructions and/or packages and/or libraries of add-on instructions can be facilitated in a relaxed mode, as described herein.

At 640, add-on instructions can be stored and/or utilized. It is to be appreciated that such add-on instructions can track nested instructions and movement within, between and/or across projects and/or libraries. When copied into a project and/or library, the other instructions it depends on can be automatically copied. In addition, if an instruction's name is the same as another instruction in the destination, handling can be employed that allows the user to update the revision in the destination or to resolve the collision. If there are multiple potential matches, the user can be provided with a message to resolve the matches. In addition, when only one instruction by a particular name exists and such instruction is updated, associated instructions can be automatically updated. It is to be appreciated that a set of locations of libraries can be configured to describe which libraries to search for dependencies and which instructions are available for employment. The locations can be local, network, web servers, and/or other type drives. Information about who created an instruction and when, who last changed it and when, and what the origin library of an instruction can be tracked regardless of where the instruction is copied. In addition, any or all such information can be protected or removed such that a library can be distributed without personal information.

Figure 7:
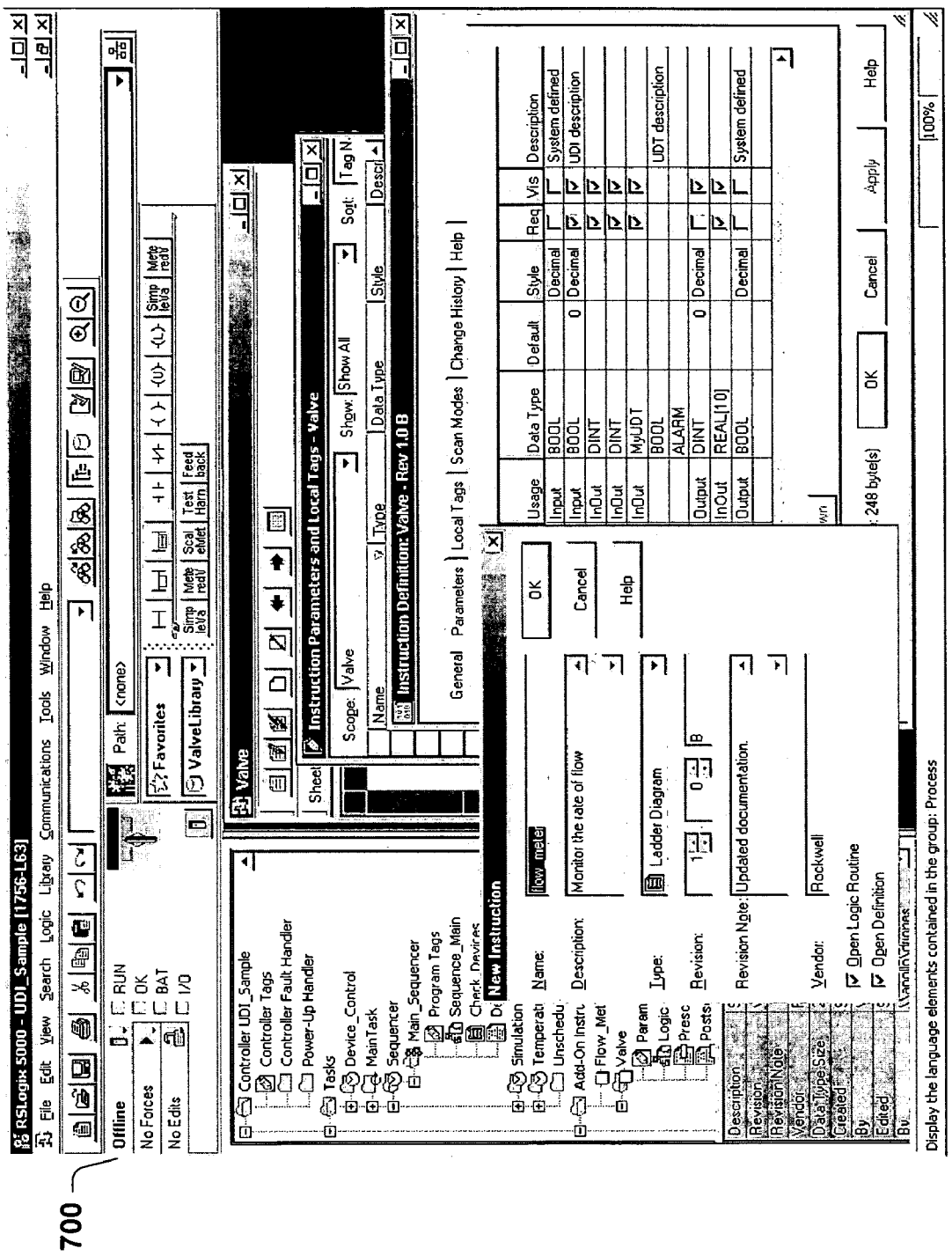
FIG. 7 illustrates an exemplary Graphical User Interface that facilitates managing add-on instructions in accordance with the subject invention.
Figure 8:
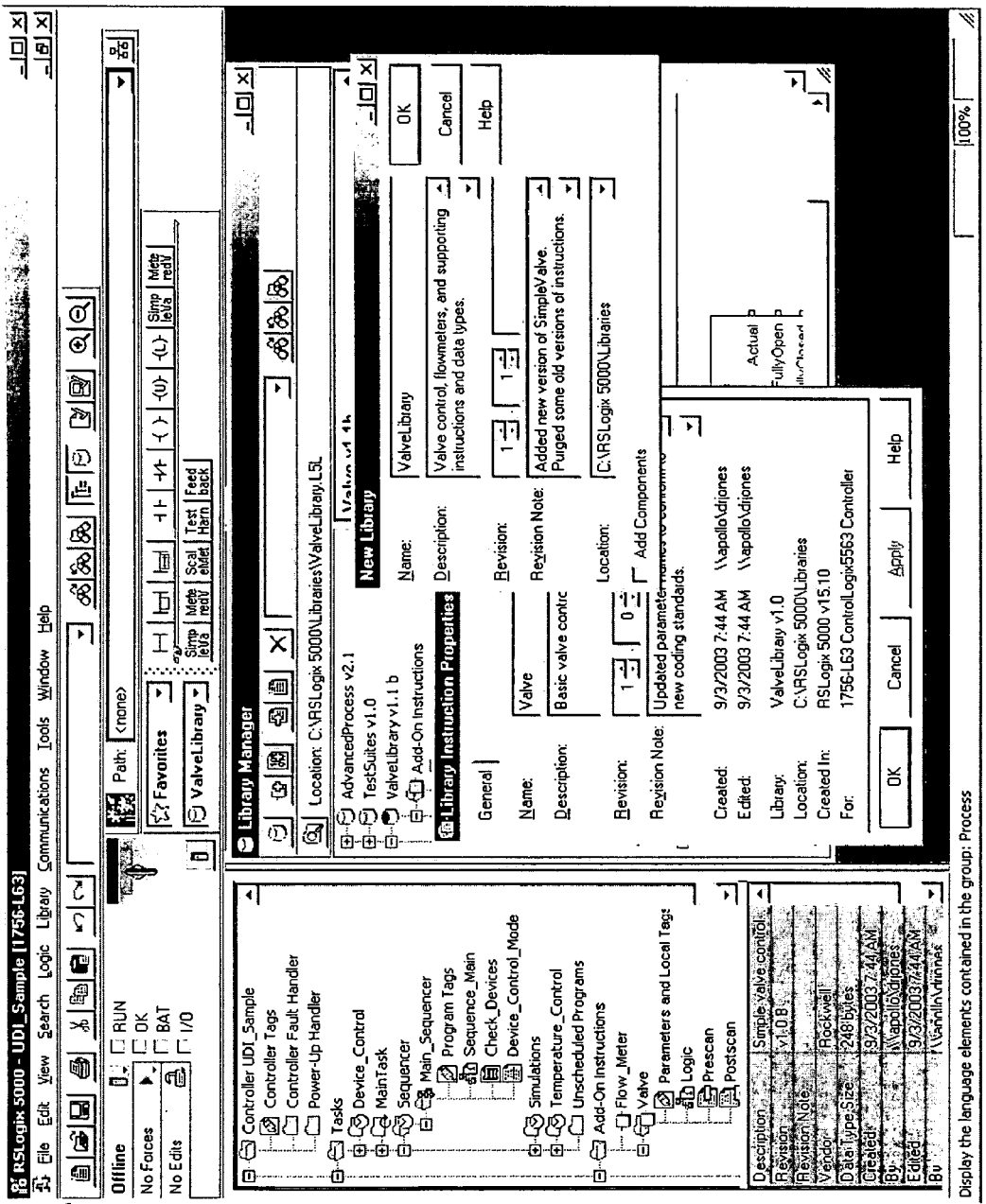
FIG. 8 illustrates an exemplary Graphical User Interface that facilitates add-on instruction library management in accordance with the subject invention.

FIGS. 7 and 8 illustrate exemplary GUIs 700 and 800 that can facilitate employment of the invention described herein. FIGS. 7 and 8 illustrate exemplary editors 700 and 800 that can be employed in accordance with an aspect of the subject invention. The editor 700 includes various regions, utilities and windows such as, for example, a region for displaying add-on instruction folders, a language element toolbar, a logic editing window, a tag editing window, an instruction editing window, a new instruction window, and an instruction quick view window. The editor 800 depicts various software user-interfaces associated with add-on instruction libraries such as a library manager window, a library instruction property window and a new library, for example.

Figure 9:
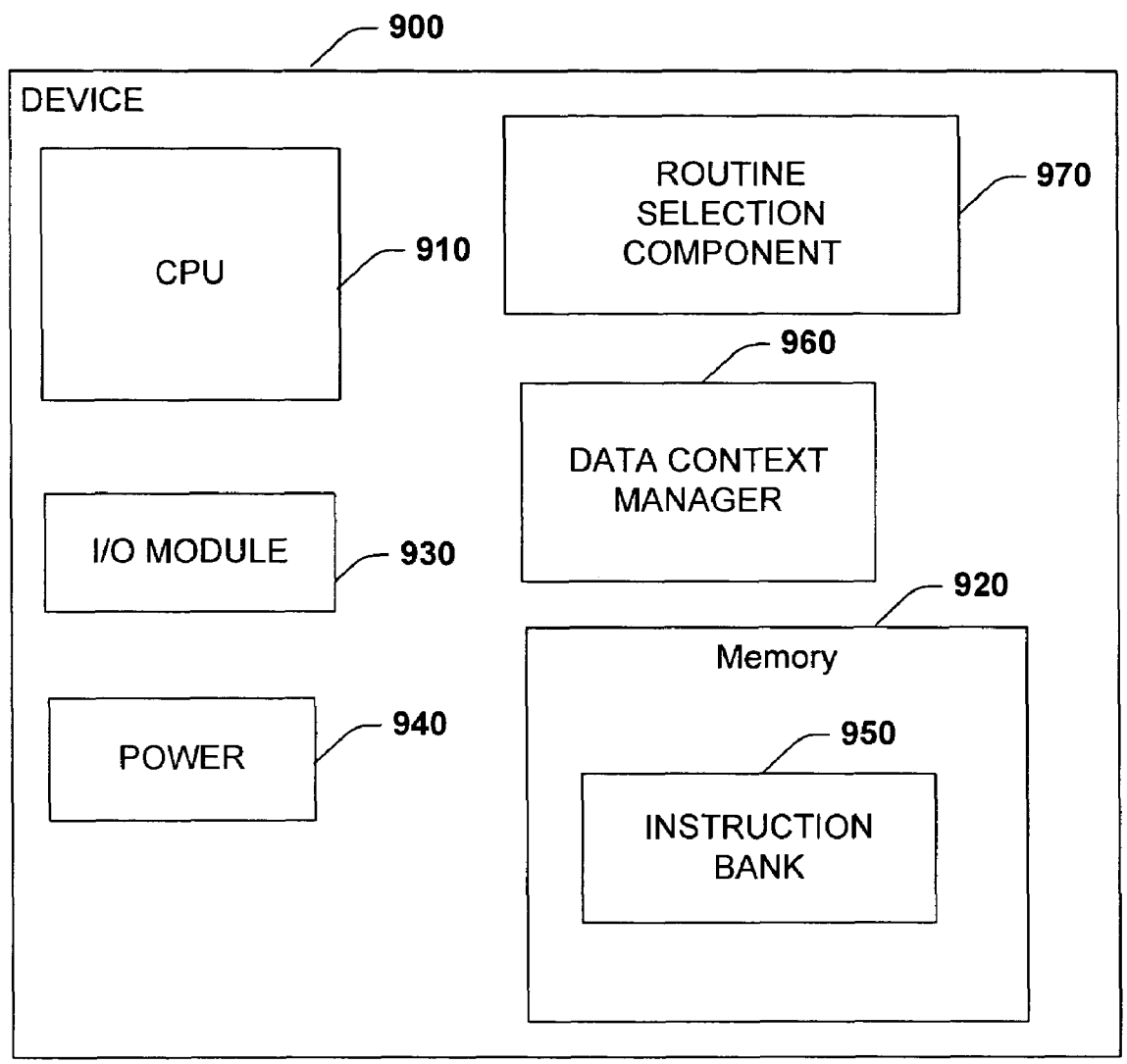
FIG. 9 illustrates an exemplary industrial control device that employs a routine selection component.

FIG. 9 illustrates an industrial device 900 in accordance with an aspect of the present invention. The industrial device 900 can be an industrial controller, a programmable logic controller (PLC), and the like. As such, the industrial device 900 can comprise one or more modules such as a processing module 910, a memory module 920, and an I/O module 930, and a power component 940 to energize components therein. The processing module 910 can be utilized to execute end-user programs and associated add-on instructions, which can be stored within an instruction bank 950 (e.g., the instruction bank 110 and 210) of the memory module 920 or external to the industrial device 900. The I/O module 930 provides communication with the environment. For example, an input channel can be employed to receive analog and digital signals through sensors, switches and the like to provide information indicative of state and/or relating to a process, whereas an output channel can be utilized to convey a next state to an entity under the control of the controller. The device 900 further includes a routine selection component 970 (e.g., the routine selection component 120 and 220 as described in connection with FIGS. 1 and 2), which can be utilized to facilitate selection/management of add-on instruction calls as described herein.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system that automatically selects an add-on instruction for execution by an industrial device, comprising following components stored in a computer memory:
    a first component that detects an add-on instruction call from a user program executing within the industrial device;
    a second component that determines a state of the add-on instruction; and
    a third component that provides a routine within the add-on instruction for execution, based at least in part on the state of the add-on instruction.

2. The system of claim 1, the state of the add-on instruction is one of a normal state; a pre-scan state; a post-scan state; and an enable false state.

3. The system of claim 1, the third component alternatively selects the routine based on a state of an equipment phase program module.

4. The system of claim 3, the state of an equipment phase program module is one of an aborting state; a holding state; a resetting state; running state; and a stopping state.

5. The system of claim 1, the add-on instruction includes and relates one or more routines, parameters, and state data associated with performing one or more control sequences.

6. The system of claim 1, the user program and the add-on instruction are generated via similar or different languages.

7. The system of claim 6, the languages include one or more of structured text (ST), sequential function chart (SFC), functional block diagram (FBD), instruction list (IL), ladder diagram (LD), C, C++, C#, Graphical Motion Language (GML), Java, and Flow-Charts.

8. The system of claim 1, the add-on instruction is passed a parameter by reference.

9. The system of claim 1, the add-on instruction is passed at least one of a complex data type and an object as a reference parameter.

10. The system of claim 1, the add-on instruction is passed a parameter via one of an array and a matrix.

11. The system of claim 1, an add-on instruction call presentation in the user program is automatically determined based on at least one of a parameter configuration defined for the add-on instruction and the language of the program.

12. The system of claim 1, further comprising a data context manager that tracks all calls from user programs to add-on instructions.

13. The system of claim 12, further comprising a presentation component that displays add-on instruction context associated with the calls.

14. The system of claim 13, a particular add-on instruction context is selected from the displayed context by a user in order to observe instance data and passed references associated with the call of the particular add-on instruction.

15. The system of claim 13, the add-on instruction context includes information regarding at least one of a call to an add-on instruction, an initiator of the call, a location of the call, the add-on instruction called, a passed reference to a complex data type, a passed reference to an object, and an instance of data of an instruction.

16. The system of claim 13, the add-on instruction context is maintained to definitively set values in a particular add-on instruction context.

17. The system of claim 1, the add-on instruction is from a library of add-on instructions.

18. The system of claim 17, the library is based on one of a markup language, binary file, and an SQL database.

19. The system of claim 1, the add-on instruction is associated with one or more of a read, a write, and an execute privilege to limit access to the add-on instruction to authorized users.

20. The system of claim 1, nested instructions within the add-on instruction are automatically copied to a project and/or library when a parent instruction is copied to the project and/or library.

21. The system of claim 1, further comprising a component that resolves match between add-on instructions with similar names.

22. The system of claim 1, the add-on instruction is encrypted, encoded, and/or password protected to mitigate unauthorized access.

23. The system of claim 1, further comprising a component that automatically generates help for the add-on instruction.

24. The system of claim 23, the help is modified to include at least one of additional text, html, drawings, audio, and external links.

25. A method that facilitates routine selection within an industrial device, comprising:
  receiving a call for an add-on instruction;
  determining a state of the add-on instruction; and
  automatically selecting a routine for execution based on the state of the add-on instruction.

26. The method of claim 25, further comprising passing one of a value parameter and a reference parameter by reference to the add-on instruction.

27. The method of claim 26, the value parameter is one of an In and an Out parameter.

28. The method of claim 26, the reference parameter is an InOut parameter.

29. The method of claim 25, further comprising passing at least one of a complex data type and an object to the add-on instruction.

30. A computer-implemented system that facilitates instruction-call management, comprising following components stored in a computer memory:
  means for calling an add-on instruction;
  means for determining a state of the add-on instruction data; and
  means for selecting a routine within the add-on instruction based on the state of the add-on instruction.

* * * * *